United States Patent
Horii

(10) Patent No.: US 11,150,942 B2
(45) Date of Patent: Oct. 19, 2021

(54) COMMUNICATION DEVICE AND COMMUNICATION METHOD USED IN DISTRIBUTED COMPUTING ENVIRONMENT

(71) Applicant: FUJITSU LIMITED, Kawasaki (JP)

(72) Inventor: Motoshi Horii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 16/724,775

(22) Filed: Dec. 23, 2019

(65) Prior Publication Data

US 2020/0225979 A1 Jul. 16, 2020

(30) Foreign Application Priority Data

Jan. 11, 2019 (JP) ............................. JP2019-003225

(51) Int. Cl.
  *G06F 9/48* (2006.01)
(52) U.S. Cl.
  CPC .................... *G06F 9/485* (2013.01)
(58) Field of Classification Search
  CPC ....................................................... G06F 9/485
  See application file for complete search history.

(56) References Cited

U.S. PATENT DOCUMENTS

| 9,274,863 | B1 | 3/2016 | Qiu et al. |
| 2012/0254287 | A1 | 10/2012 | Watanabe |
| 2016/0150059 | A1 | 5/2016 | Meng et al. |
| 2018/0189100 | A1 | 7/2018 | Nemoto et al. |
| 2019/0097807 | A1* | 3/2019 | Mahanta ................. H04L 63/10 |

FOREIGN PATENT DOCUMENTS

| JP | 2015-146165 | | 8/2015 |
| WO | 2017/194976 | A1 | 11/2017 |
| WO | 2018/142948 | A1 | 8/2018 |

OTHER PUBLICATIONS

EESR—Extended European Search Report of European Patent Application No. 19220000.4 dated Apr. 3, 2020.
EPOA—Office Action of European Patent Application No. 19220000.4 dated Jul. 19, 2021.

* cited by examiner

*Primary Examiner* — Charlie Sun
(74) *Attorney, Agent, or Firm* — Fujitsu Patent Center

(57) ABSTRACT

A communication device among a plurality of communication devices is used in a distributed computing system. The distributed computing system executes a target process including a plurality of partial processes by using the plurality of communication devices. The communication device includes a memory and a processor. The memory stores a trail that represents a state of the plurality of partial processes. The processor selects, from among the plurality of partial processes, an uncompleted partial process with a number of equivalent execution results being less than a target number according to the trail. The processor executes the uncompleted partial process selected by the selector. The processor records an execution result obtained by the execution unit in the trail.

6 Claims, 17 Drawing Sheets

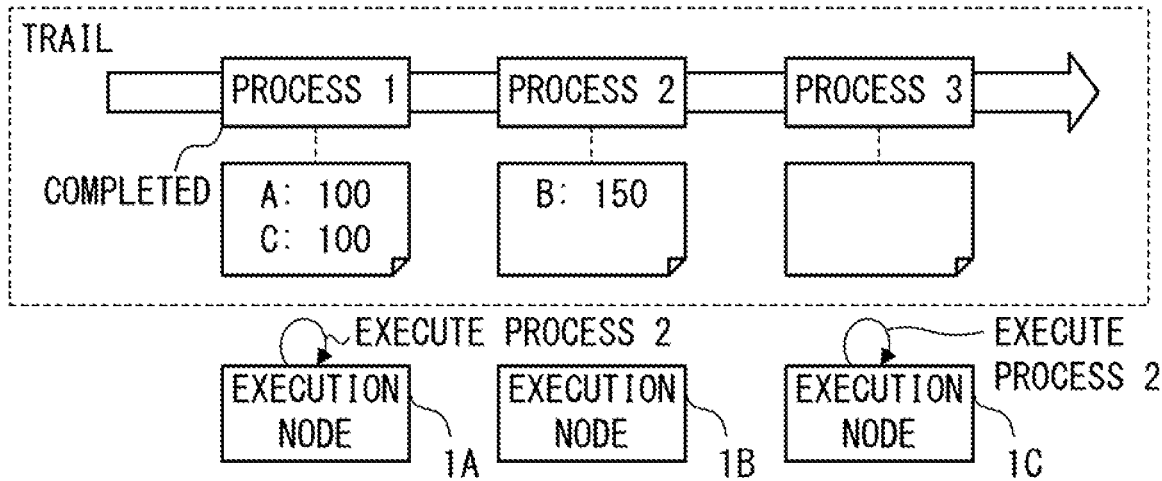
F I G. 5 A
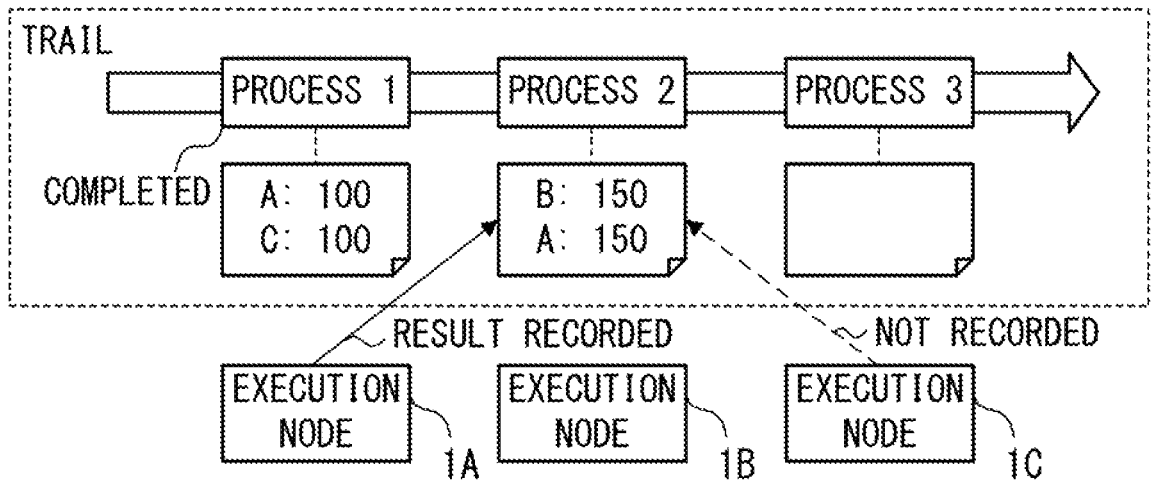
F I G. 5 B

| APPLICATION NAME | PARTIAL PROCESS LIST | PROCESS DETAIL | NUMBER OF NECESSARY RESPONSES |
|---|---|---|---|
| VIDEO PROCESSING APPLICATION | COMPRESSION | PROCESS DETAIL WRITTEN IN CODE | 3 |
| | SOUND | SAME AS ABOVE | 2 |
| | MOSAIC | SAME AS ABOVE | 3 |
| | CAPTION | SAME AS ABOVE | 2 |
| | ... | ... | ... |
| ... | ... | ... | ... |

FIG. 8

| NODE NAME | ACCESS |
|---|---|
| 1A | https://node1a.com/api-gw |
| 1B | https://node1b.com/api-gw |
| 1C | https://node1c.com/api-gw |
| ... | ... |

F I G. 9

| APPLICATION NAME | PARAMETER | | REQUEST NODE | PROCESS LIST | PROCESS DETAIL | NUMBER OF NECESSARY RESPONSES | NUMBER OF VALID RESPONSES | STATE | EXECUTION RESULT (HASH VALUE) | EXECUTION NODE | EXECUTION TIME |
|---|---|---|---|---|---|---|---|---|---|---|---|
| VIDEO PROCESSING APPLICATION | VIDEO DATA | | NODE 3 | COMPRESSION | PROCESS DETAIL WRITTEN IN CODE | 3 | 3 | COMPLETED | 7d97... | 1A | 2018/11/5 15:22:35 |
| | | | | | | | | | 7d97... | 1B | 2018/11/5 15:22:36 |
| | | | | | | | | | 7d97... | 1C | 2018/11/5 15:22:39 |
| | | | | SOUND | SAME AS ABOVE | 2 | 2 | COMPLETED | 6042... | 1B | 2018/11/5 15:22:42 |
| | | | | | | | | | 6042... | 1D | 2018/11/5 15:22:45 |
| | | | | MOSAIC | SAME AS ABOVE | 3 | 2 | UNCOMPLETED | dead... | 1D | 2018/11/5 15:23:01 |
| | | | | | | | | | beaf... | 1B | 2018/11/5 15:23:04 |
| | | | | CAPTION | SAME AS ABOVE | 2 | 0 | | dead... | 1A | 2018/11/5 15:23:05 |
| | | | | | | | | | (NO RESPONSE) | (NO RESPONSE) | (NO RESPONSE) |
| | | | | ... | ... | ... | ... | ... | ... | ... | ... |
| SCIENCE COMPUTING APPLICATION | DATA TO BE ANALYZED | | NODE 4 | | | | | | | | |

F I G. 1 0

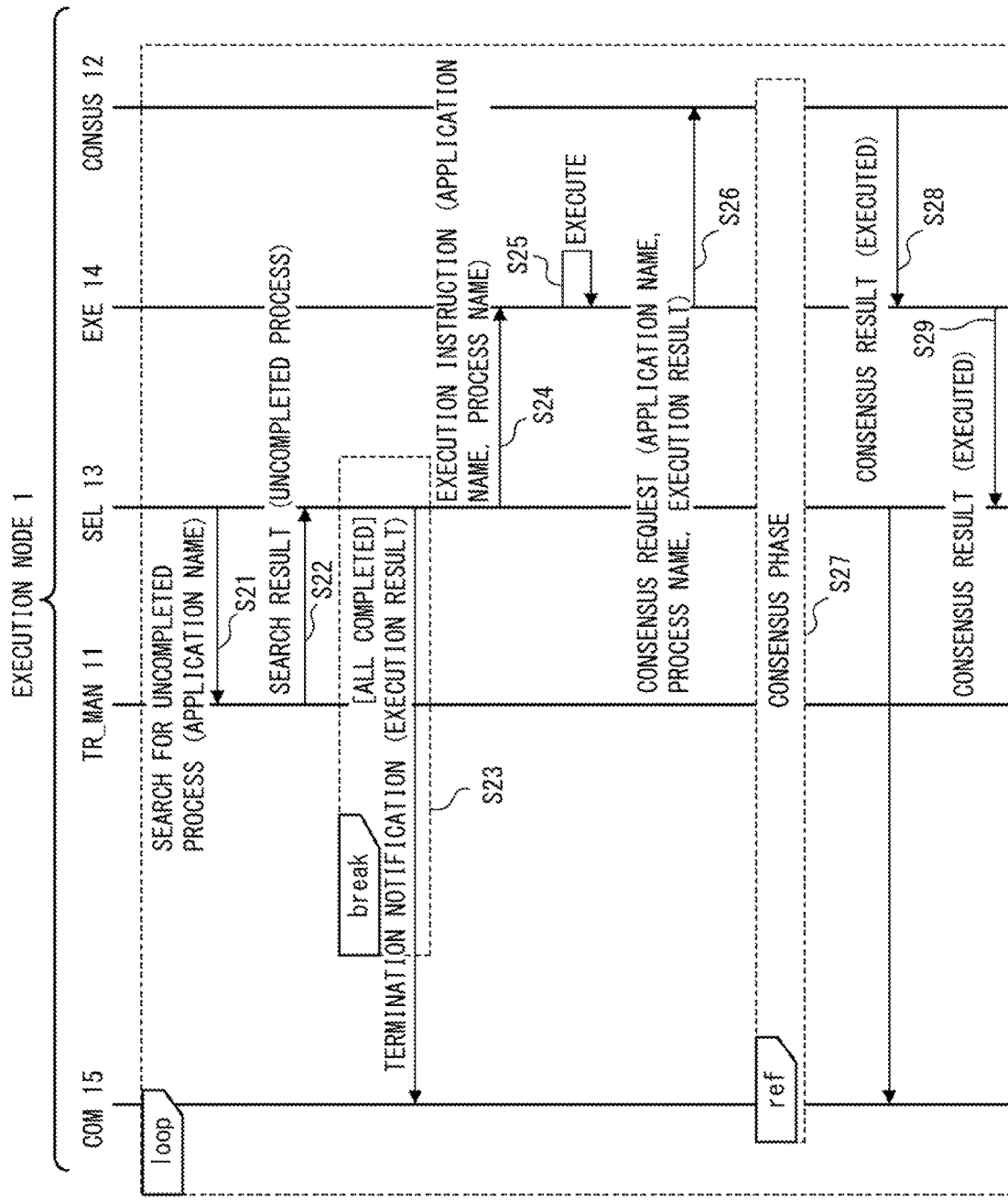
F I G. 12

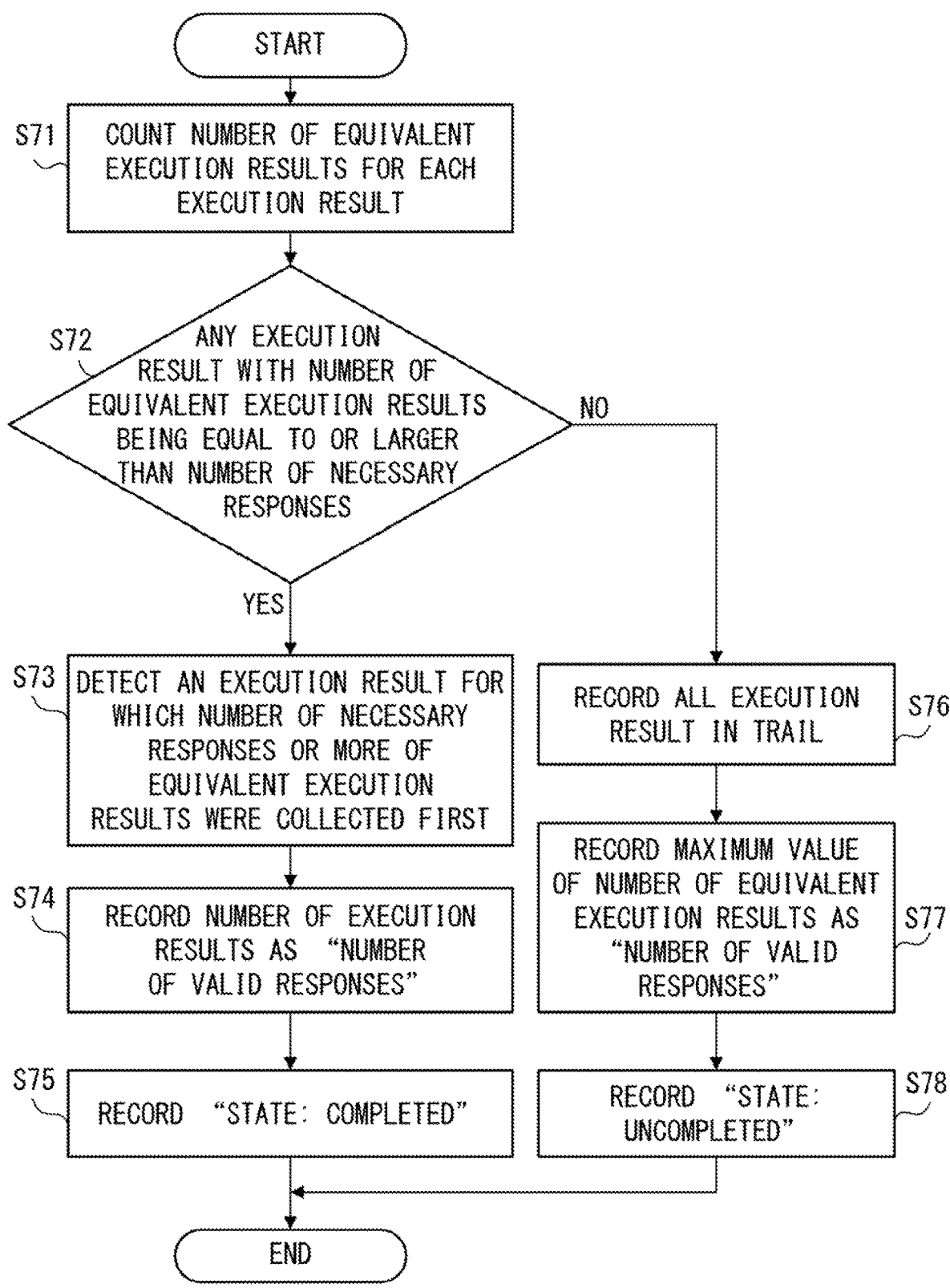
F I G. 15

COMMUNICATION DEVICE AND COMMUNICATION METHOD USED IN DISTRIBUTED COMPUTING ENVIRONMENT

CROSS-REFERENCE TO RELATED APPLICATIONS

This application is based upon and claims the benefit of priority of the prior Japanese Patent Application No. 2019-003225, filed on Jan. 11, 2019, the entire contents of which are incorporated herein by reference.

FIELD

The embodiments discussed herein are related to a communication device and a communication method that are used in a distributed computing environment.

BACKGROUND

Distributed computing has been proposed as one of technologies for large capacity computing without using large-scale computers. In the distributed computing, a program is divided into multiple program components and the multiple program components are executed by multiple computers. At that, time, those multiple computers proceed with computing as a whole while communicating with each other over a network.

As an example of distributed computing, volunteer computing has been put to practice use. The volunteer computing uses distributed spare computing resources to execute a given process. For example, the volunteer computing may be used in the search for extraterrestrial intelligence.

FIG. 1 illustrates an example of a conventional distributed computing system. In this example, the distributed computing system includes a control node computer and multiple execution node computers. Note that the distributed computing system may be implemented by the distributed computing.

Each execution node computer provides spare computing resources to the distributed computing system. The control node computer divides an application program provided by a user into multiple program components and distributes the components to execution node computers. At that time, the control node computer determines an allocation of program components to the execution node computers. Each execution node computer executes the provided program component and transmits the computing result to the control node computer. The control node computer collects and verifies the computing results from the execution node computers.

BOINC (Berkeley Open Infrastructure for Network Computing) has been known as a platform for distributed computing or volunteer computing. Moreover, related technologies are disclosed in WO2018/142948 and Japanese Laid-open Patent Publication No. 2015-146165.

As described above with reference to FIG. 1, a control node computer controls processing of multiple execution node computers in the conventional distributed computing systems. In case of failure in the control node computer, execution of an application can no longer be continued. For that reason, the conventional distributed computing systems have low reliability (particularly, fault tolerance). In addition, computing results of execution node computers are verified by the control node computer. In other words, the control node computer can make a falsification of the computing results. From this point of view as well, the conventional distributed computing systems have low reliability.

SUMMARY

According to an aspect ox the embodiments, a communication device among a plurality of communication devices is used in a distributed computing system that execute a target process including a plurality of partial processes by using the plurality of communication devices. The communication device includes: a memory configured to store a trail that represents a state of the plurality of partial processes; and a processor configured to select, from among the plurality of partial processes, an uncompleted partial process with a number of equivalent execution results being less than a target number according to the trail; execute the uncompleted partial process selected by the selector; and record an execution result obtained by the execution unit in the trail.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4A, FIG. 4B, FIG. 5A, FIG. 5B, and FIG. 6 illustrate an example of a flow of processing in a distributed computing system;

FIG. 8 illustrates an example of a process list;

FIG. 9 illustrates an example of an execution node list;

FIG. 10 illustrates an example of a trail;

FIG. 12 illustrates an example of a sequence of an execution phase;

FIG. 15 is a flowchart of an example of processing for updating a trail;

DESCRIPTION OF EMBODIMENTS

Figure 2:
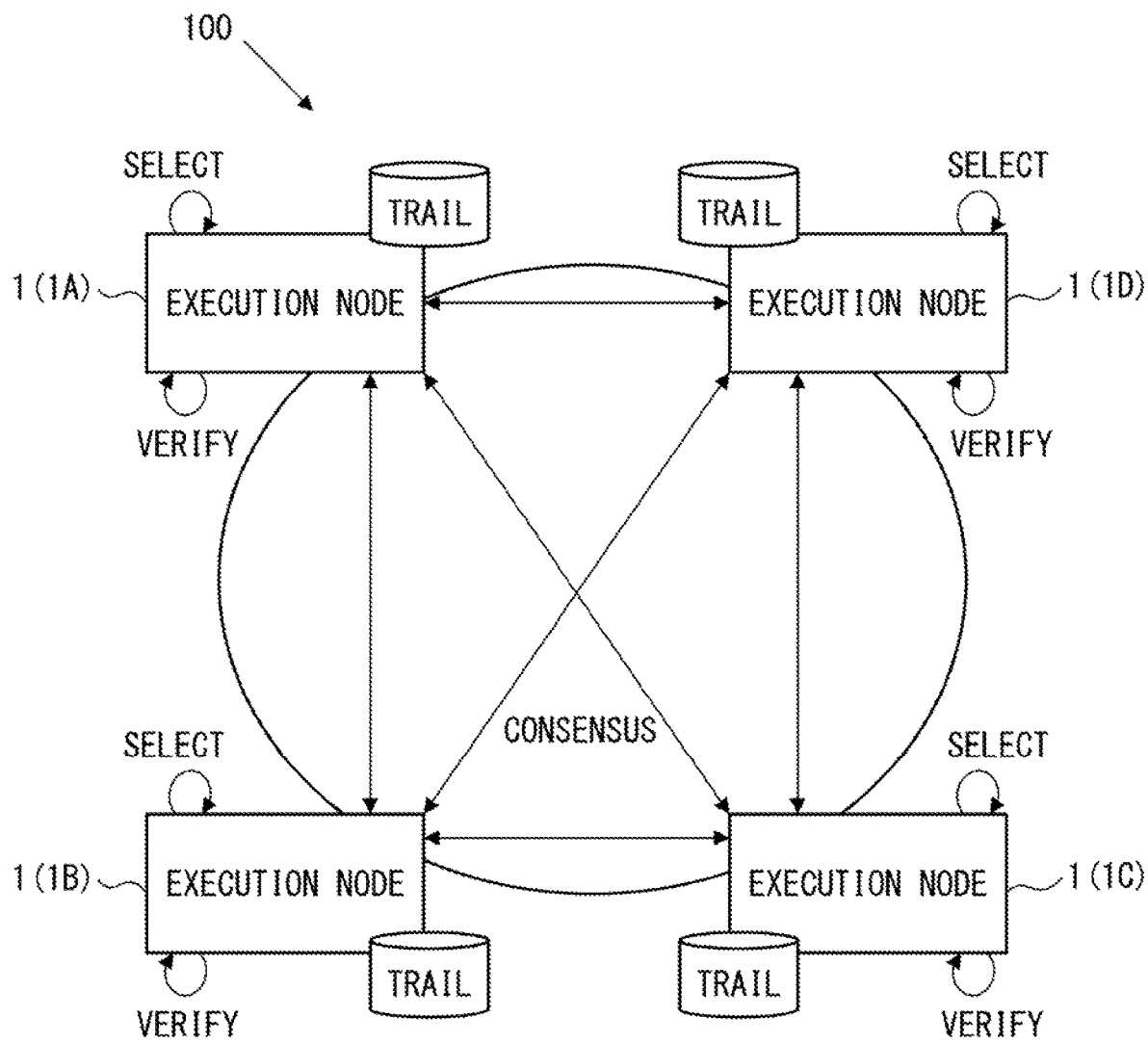
FIG. 2 illustrates an example of a distributed computing system according to the embodiments.

FIG. 2 illustrates an example of a distributed computing system according to the embodiments of the present invention. A distributed computing system 100 according to the embodiments includes multiple execution node computers 1 (1A to 1D). The execution node computers 1A to 1D are communicably coupled with each other. The execution node computers 1A to 1D may be coupled with each other via an optical fiber link, via an electric line, or via a wireless link. Note that each of the execution node computers 1 (1A to 1D) is an example of a communication device according to the embodiments.

A process of an application provided to the distributed computing system 100 is composed of multiple partial processes. For example, the process of the application provided to the distributed computing system 100 is divided in advance into multiple partial, processes. Or, the process of the provided application may be divided into multiple partial processes by the distributed computing system 100.

Each of the execution node computers 1A to 1D autonomously selects a partial process to execute from among the multiple partial processes and executes the selected partial process. Each of the execution node computers 1A to 1D then records an execution result of the selected partial process in a trail. A trail includes, as an example, information identifying a node that executed a selected partial process, information identifying the selected partial process, an execution result of the selected partial process, and a timestamp indicating a point in time at which execution of the selected partial process is terminated. In this embodiment, trails are stored in respective nodes. However, when a trail is updated in one of nodes in a network, the other nodes in the network are notified of the updated content. In other words, a trail is substantially shared by execution node computers 1A to 1D. Alternatively, a trail may be stored in a region to which each of the execution node computers 1A to 1D in the network can access.

The execution node computers 1A to 1D form a consensus of execution results for each of the partial processes. The consensus can be achieved by checking with each other that recorded trail contents (e.g., the details of process and the order of process) are the same in each of the execution node computers 1A to 1D. As a result of this consensus forming, a trail stored in a node being the same as the trails in the other nodes can be guaranteed.

A predetermined order, for example, is specified so that the multiple partial processes are executed in the order. In this case, when a consensus on a partial process :is formed by the execution node computers 1A to 1D, the next partial process may be executed. When a consensus on all the partial processes is formed, the distributed computing system 100 outputs an execution result of the provided application.

Figure 3:
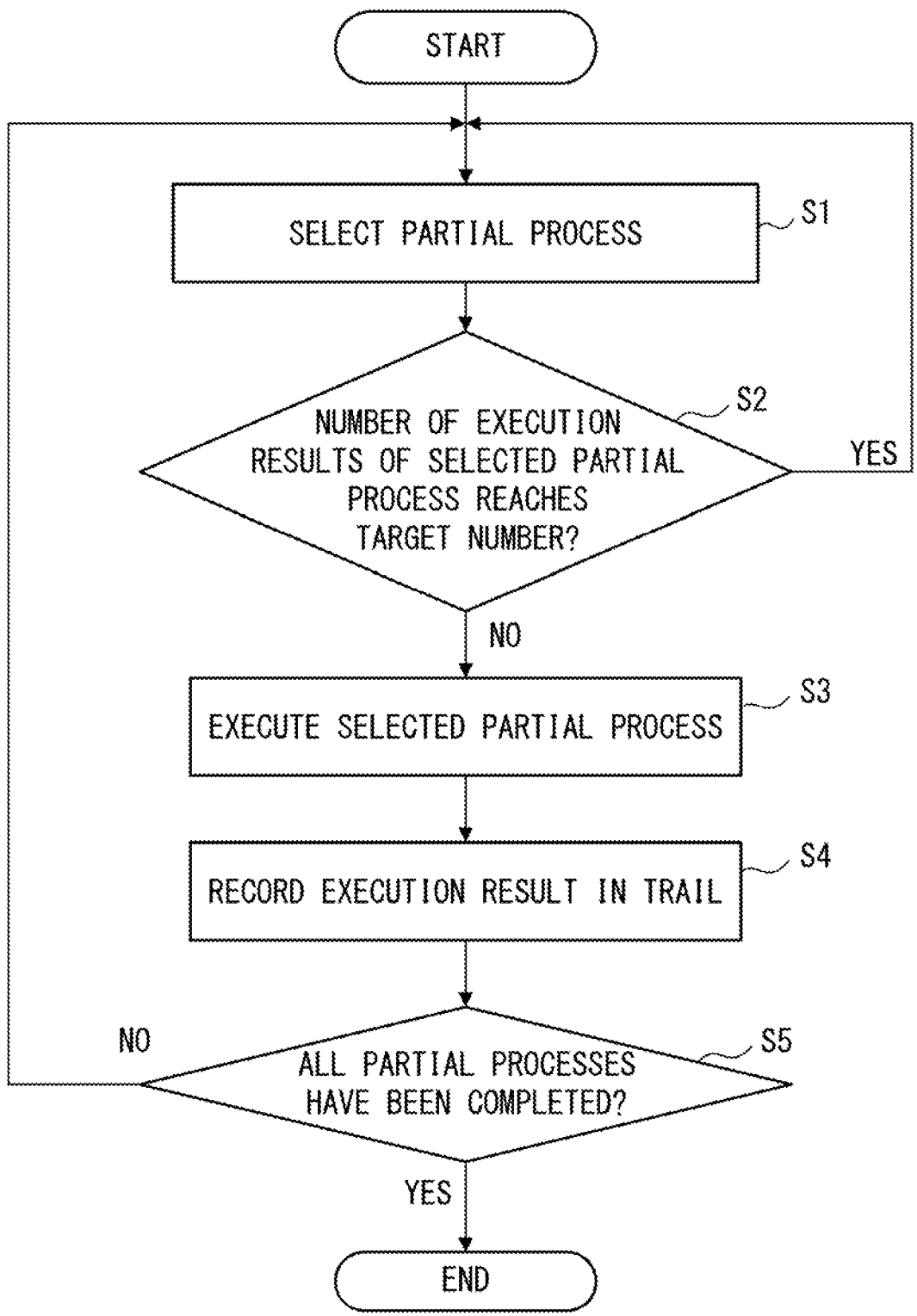
FIG. 3 is a flowchart of an example of processing in an execution node computer.

FIG. 3 is a flowchart of an example of a process executed in an execution node computer 1. The process in this flowchart is executed when an application including multiple partial processes is provided to the distributed computing system 100.

In S1, the execution node computer 1 refers to a trail stored in its own node (that is, stored in a local memory) and selects a partial process to execute from among the multiple partial processes. Note that an order of executing the partial processes is specified in advance. In this case, a partial process that needs to be executed first is selected from among partial processes that have not been completed.

In S2, the execution node computer 1 refers to a trail stored In its own node and determines whether the number of execution results of the selected partial process (the current number of responses) reaches a target number (the number of necessary responses) or not. At that time, whether the number of equivalent execution results reaches the target number or not is determined. Note that the target number (the number of necessary responses) is determined in advance in the distributed computing system 100.

When the current number of responses of the partial process selected in S1 reaches the number of necessary responses, the execution node computer 1 determines that the selected partial process to be completed and a consensus on the execution result to be formed. In this case, the process in the execution node computer 1 returns to S1. In other words, the next partial process is selected. On the other hand, when the current number of responses of the partial process selected in S1 is less than the number of necessary responses, the process in the execution node computer 1 proceeds to S3.

In S3, the execution node computer 1 executes the selected partial process by using an execution result of a partial process that is one process before the selected partial process. Note that the execution result of a partial process that is one process before the selected partial process is recorded in the trail.

In S4, the execution node computer 1 records the execution result of the selected partial process in the trail. Here, it is preferable that the execution node computer 1 records the execution result in the trail after a consensus on the execution result is obtained from some or all of the execution node computers 1. The execution node computer 1 may record the execution result of the selected partial process in the trail only when the current number of responses is less than the number of necessary responses. The updated trail is shared by all the execution node computers 1 in the distributed computing system 100.

In S5, the execution node computer 1 refers to the trail stored in its own node and determines whether ail the partial processes have been completed or not. When any partial process that has not been completed is remaining, the process in the execution node computer 1 returns to S1. In other words, the next partial process is selected. On the other hand, when all the partial processes have been completed, the process in the execution node computer 1 is terminated, and subsequently, the distributed computing system 100 outputs an execution result.

FIG. 4A, FIG. 4B, FIG. 5A, FIG. 5B, and FIG. 6 illustrate an example of a flow of a process in the distributed computing system 100. In this example, the distributed computing system 100 has execution node computers 1A to 1C. An application provided to the distributed computing system 100 includes a partial process 1, a partial process 2, and a partial process 3. An order of execution is determined in advance so that the partial process 1 is executed first, execution of the partial process 2 follows the execution of the partial process 1, and the partial process 3 is executed in the last place. Note that in FIG. 4A, FIG. 4B, FIG. 5A, FIG. 5B, and FIG. 6, the partial process 1, the partial process 2, and the partial process 3 are described as "process 1", "process 2", and "process 3", respectively.

Here, trails stored in execution node computers 1A to 1C are synchronized with one another. In other words, contents of the trail that each of the execution node computers 1A to 1C refers to are the same. The trail represents states of multiple partial processes included in a provided application. In the example illustrated in FIG. 4A, FIG. 4B, FIG. 5A, FIG. 5B, and FIG. 6, the trail includes information representing a partial process list and execution states of every partial processes. In the partial process list, the partial process 1, the partial process 2, and the partial process 3 are listed in this order. The information representing execution states of respective partial processes includes information identifying nodes that executed the partial processes and execution results.

Figure 4A:
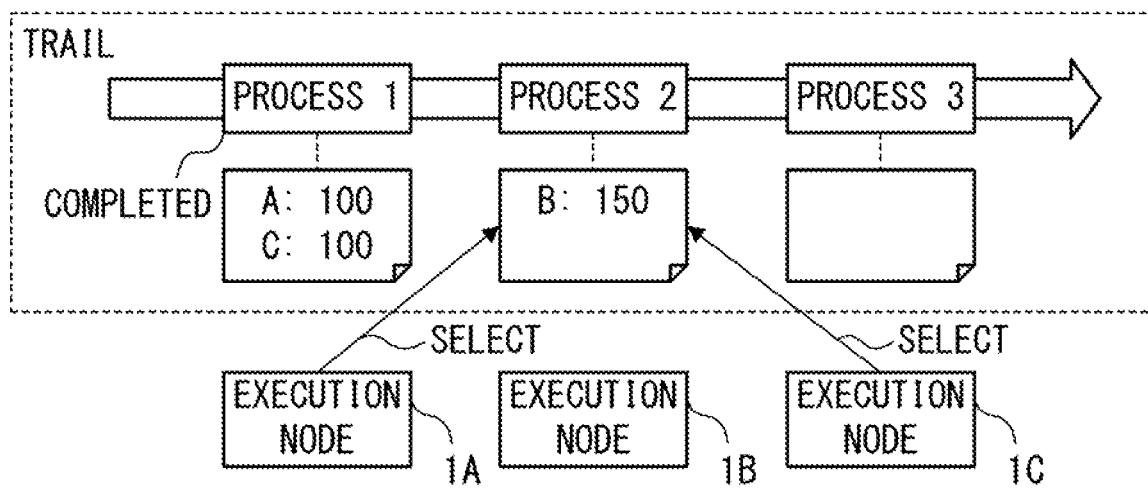

The trail provided in FIG. 4A, for example, represents a state in which the execution result of the partial process 1 is "100" in the execution node computer 1A and the execution result of the partial process 1 is also "100" in the execution node computer 1C. This trail also represents a state in which the execution result of the partial process 2 is "150" in the execution node computer 1B.

In the following description, a process in the execution node computers 1 after the state provided in FIG. 4A is explained with reference to the flowchart in FIG. 3. Note that in this example, the above-described target number (the number of necessary responses) is "2". In this case, when two or more equivalent execution results are obtained for a partial process, it is determined that a consensus on the execution results is formed in the distributed computing system 100. In other words, when two or more equivalent execution results are obtained for a given partial process, it is determined that the partial process has been completed successfully.

S1: Each execution node computer 1 refers to a trail stored in its own node and selects a partial process to be executed from among the partial processes 1 to 3. Here, two equivalent execution results of the partial process 1 are recorded in the trail. By referring to the trail, each of the execution node computers 1A to 1C determines that the partial process 1 has already been completed. Accordingly, the execution node computers 1A to 1C refer to a trail of the next partial process of the partial process 1 (i.e., the partial process 2).

The execution node computer 1A, for example, selects the partial process 2, as illustrated in FIG. 4A. The execution node computer 1C also selects the partial process 2. Note that since each of the execution node computer 1A to 1C autonomously operates, multiple execution node computers 1 may select same partial process at the same time or almost at the same time.

Figure 4B:
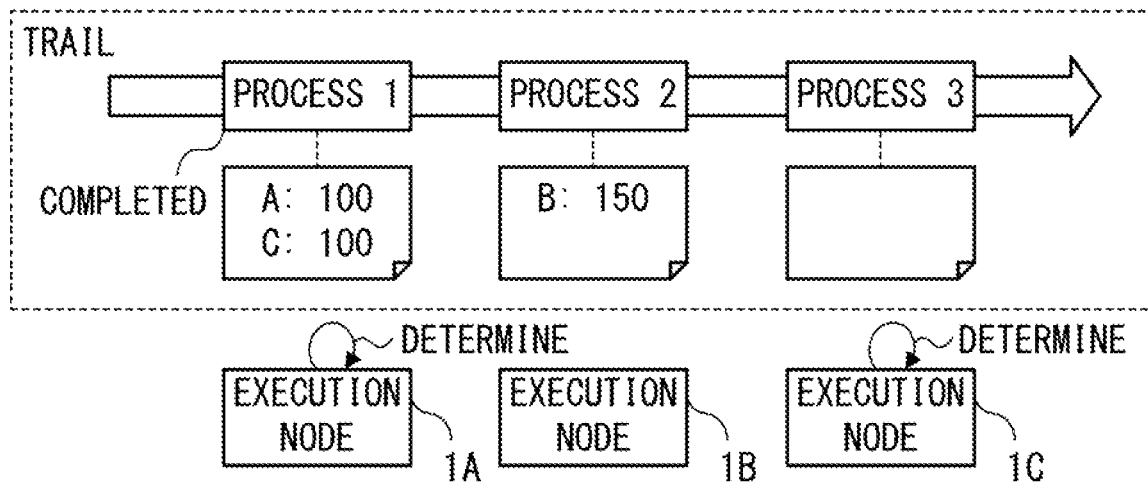

S2: Each of the execution node computers 1A and 1C, as illustrated in FIG. 4B, determines whether the number of equivalent execution results (the current number of responses) of the partial process 2 reaches the target number (the number of necessary responses) or not. In this example, one execution result of the partial process 2 is recorded. In other words, the current number of responses is less than the number of necessary responses. Accordingly, the process in each of the execution node computers 1A and 1C proceeds to S3.

S3: Each of the execution node computer 1A and 1C executes the partial process 2 as illustrated in FIG. 5A. At that time, the partial process 2 is executed with the use of the execution result of a partial process that is one process before the partial process 2 (i.e., the partial process 1). More specifically, each of the execution node computers 1A and 1C executes the partial process 2 by using "execution result of partial process 1=100".

The execution node computers 1A and 1C respectively execute the partial process 2 in this manner. Here, the following description is under the assumption that the execution of the partial process 2 carried out by the execution node computer 1A is finished before the execution of the partial process 2 carried out by the execution node computer 1C is finished.

In this case, the execution node computer 1A refers to the trail and checks the state of the partial process 2. At that time, one execution result of the partial process 2 has been recorded in the trail. In other words, the current number of responses is less than the number of necessary responses. Accordingly, the execution node computer 1A records the execution result of the partial process 2 in the trail. In this example, "execution result of partial process 2=150" is written in the trail by the execution node computer 1A as illustrated in FIG. 5B.

Next, the execution node computer 1C, after finishing the execution of the partial process 2, refers to the trail and checks the state of the partial process 2. At that point in time, however, two execution results of the partial process 2 have already been recorded in the trail, and these two execution results are equivalent to each other. In other words, the current number of responses of the partial process 2 has reached the number of necessary responses. Accordingly, the execution node computer 1C determines the partial process 2 to have already been completed successfully and does not record the execution result of the partial process 2 in the trail.

Figure 6:
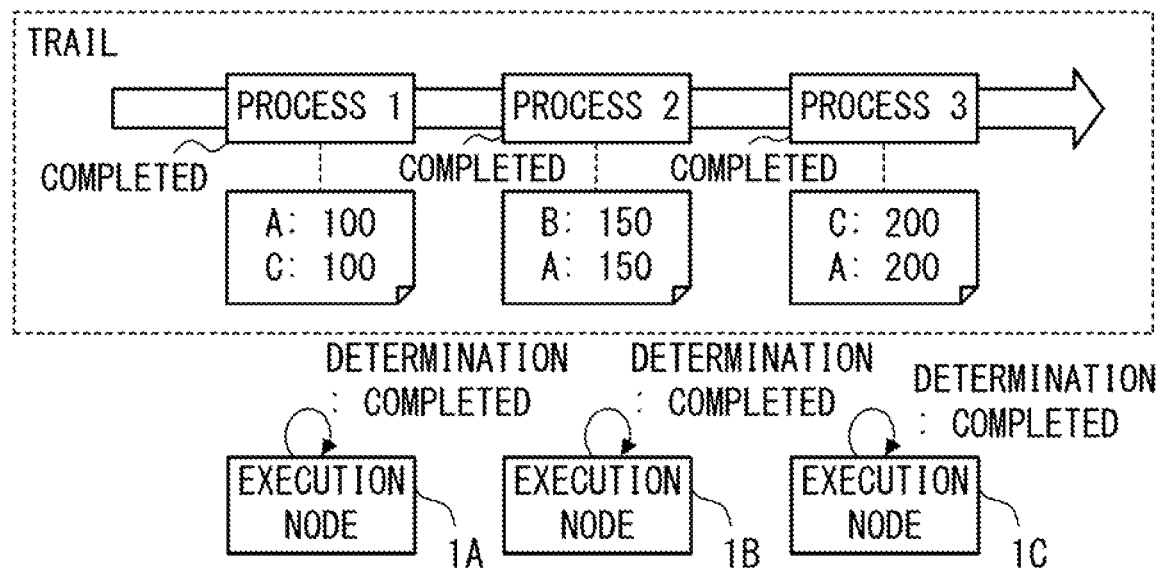

Afterwards, the partial process 3 is executed in the same manner, and a trail provided in FIG. 6 is generated. When all the partial processes 1 to 3 have been completed, the distributed computing system 100 outputs a final execution result. In other words, "execution result=200" is output from the distributed computing system 100.

Figure 1:
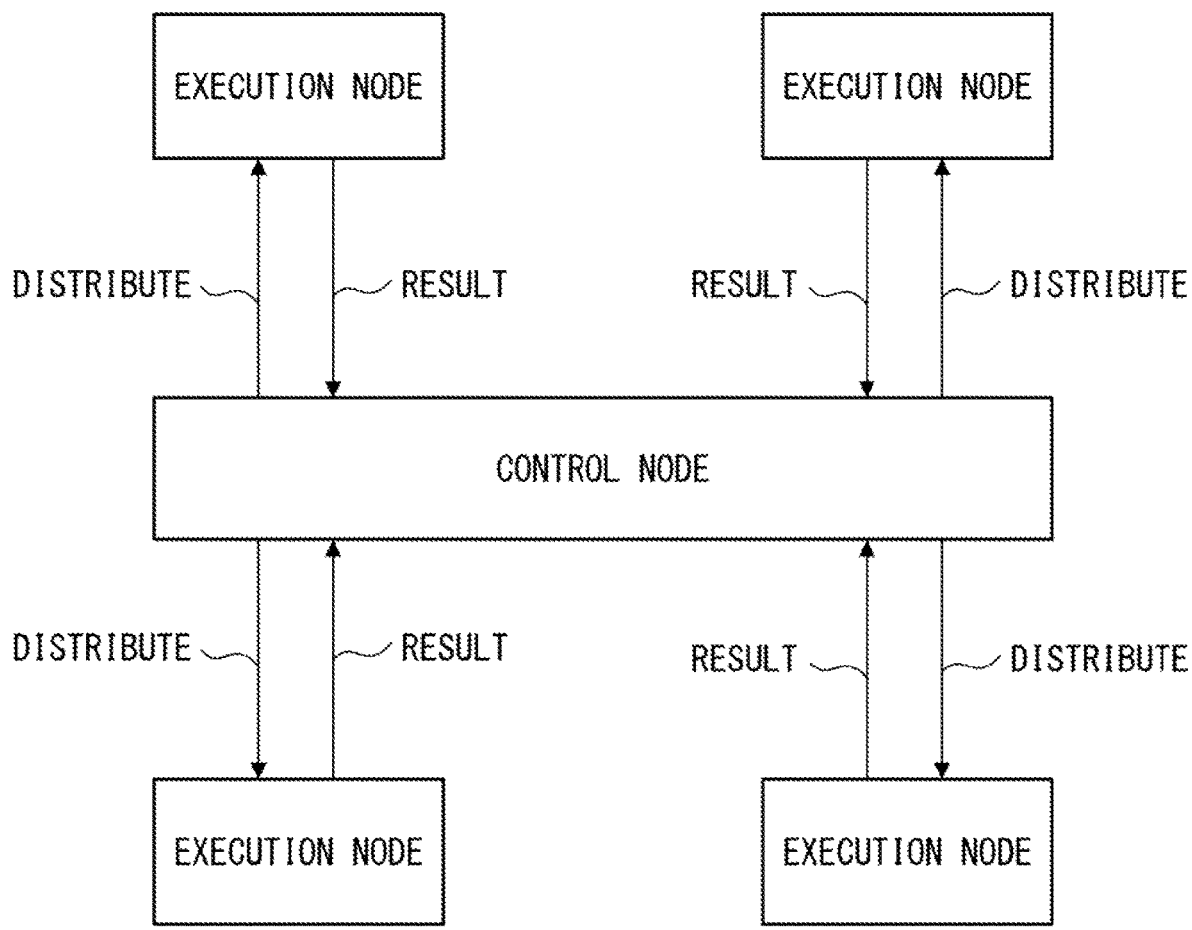
FIG. 1 illustrates an example of a conventional distributed computing system.

In this manner, the distributed computing system 100 realizes distributed computing without a control node computer that controls execution node computers 1. This configuration is more fault-tolerant than the configuration illustrated in FIG. 1 (i.e., a configuration that needs a control node computer controlling execution node computers). For example, in this distributed computing system 100, even when some of multiple execution node computers 1 fail, a process of an application can be continued by the other execution node computers 1.

Moreover, a partial process is completed when multiple execution results of the partial process are generated by multiple execution node computers 1 and a specified number (a target number or a necessary number of responses) or more of those execution results agree with each other. In this system, it will be difficult for one or a few numbers of execution node computers 1 to commit a fraud or make a falsification. In addition, even when one or a few number of execution node computers 1 are taken over by a malicious user, a wrong execution result will not be output.

Embodiments

Figure 7:
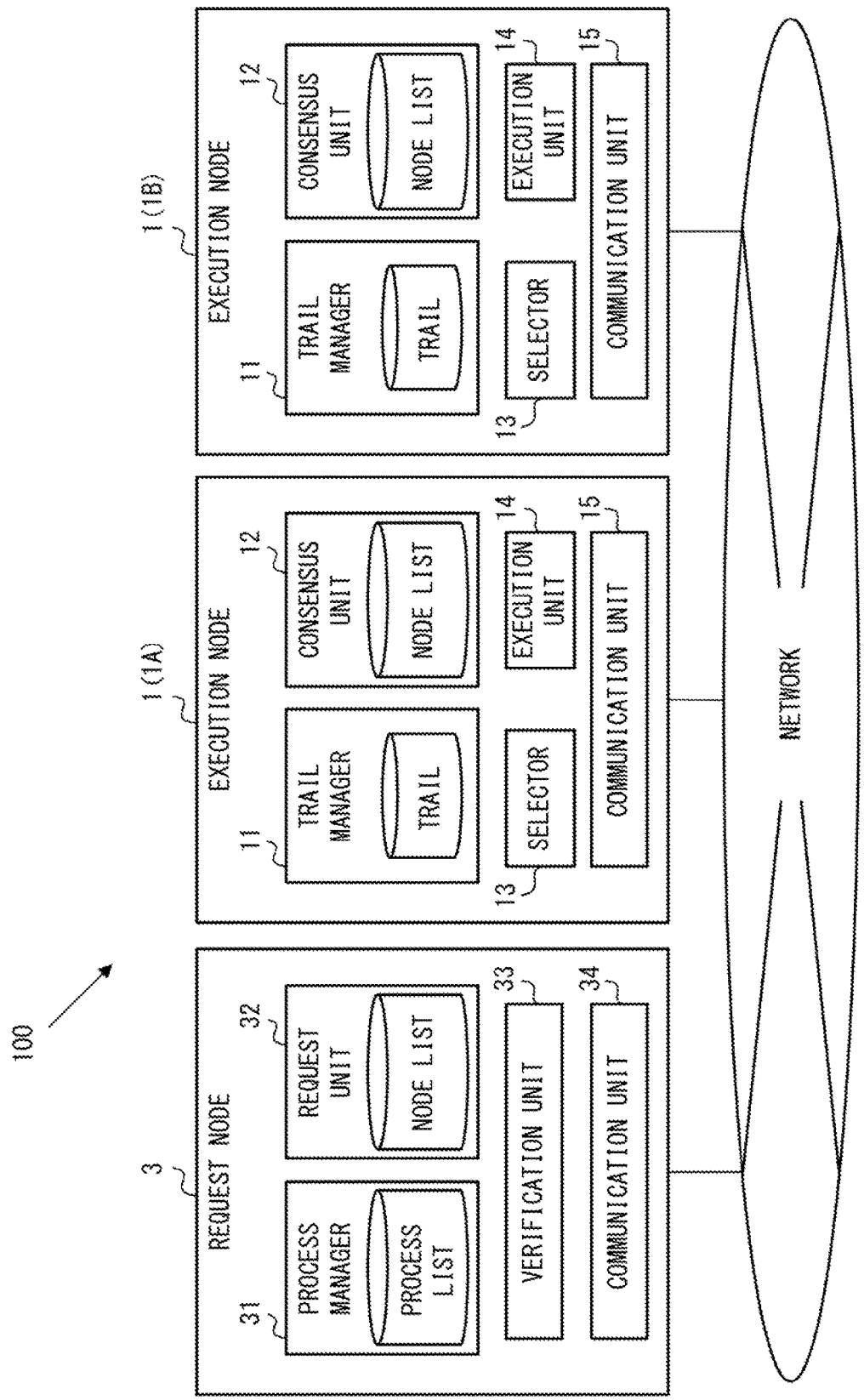
FIG. 7 illustrates an example of a configuration and a function of a distributed computing system.

FIG. 7 illustrates an example of a configuration and a function of the distributed computing system 100. In this embodiment, the distributed computing system 100 is provided with a request node computer 3 and multiple execution node computers 1 (1A and 1B). Note that the distributed computing system 100 may not include the request node computer 3. In other words, the request node computer 3 may be provided outside of the distributed computing system 100. In addition, the number of the execution node computers 1 is not limited in particular.

The request node computer 3 includes a process manager 31, a request unit 32, a verification unit 33, and a communication unit 34. Here, the request node computer 3 may include other functions that are not illustrated in FIG. 7.

The process manager 31 uses a process list to manage applications to be executed by the execution node computers 1. Note that the applications to be executed by the execution node computers 1 may be indicated by a user.

FIG. 8 illustrates an example of a process list. In this embodiment, an application name, a partial process list, a process detail, the number of necessary responses, and others are registered in the process list. The application name indicates names (or identification) of applications received from a user. The partial process list indicates names (or identification) of multiple partial processes included in an application received from the user. In this embodiment, a video processing application includes partial processes such as compression process, sound process, mosaic process, and caption process. The process detail describes details of a corresponding partial process. The number of necessary responses indicates the number of equivalent execution results that is needed to complete the partial process. For example, the number of necessary responses for compression process is "3". In this case, the compression process is executed by different execution node computers 1 until three execution results that agree with each other are obtained.

Note that in this embodiment, a user, for example, divides an application and defines multiple partial processes. In such a case, the number of necessary responses for each partial process is also defined by the user.

The request unit. 32 requests that the execution node computers 1 execute an application registered in the process list. Here, the request unit 32 has an execution node list. As illustrated in FIG 9, the execution node computers 1 that operate in the distributed computing system 100 are registered in the execution node list. In this embodiment, the execution node computers 1A, 1B, and 1C are registered in the execution node list. In addition, information for accessing to each of the execution node computers 1 is also registered in the execution node list.

The verification unit 33 verifies whether an application, the execution of which was requested to the execution node computers 1, has been completed successfully or not. The communication unit 34 communicates with other execution node computers 1 over a network.

Each of the execution node computers 1 includes a trail manager 11, a consensus unit 12, a selector 13, an execution unit 14, and a communication unit 15. The execution node computer 1 may have functions other than those illustrated in FIG. 7.

When the execution node computer 1 receives an execution request of an application from the request node computer 3, the trail manager 11 records information related to the application in the trail. The trail manager 11 also records an execution result by the execution node computer 1 in the trail.

FIG. 10 illustrates an example of a trail. In this embodiment, a trail is generated for each application to be executed. A parameter indicates data to be processed by the application. A request node name identifies a node that requested the execution of the application to the execution node computers 1. The partial process list, the process detail code, and the number of necessary responses are substantially the same in the process list in FIG. 8 and the trail in FIG. 10, and the explanation is therefore omitted.

The number of valid responses is the number of execution results (i.e., responses) that are obtained for a corresponding partial process and that agree with each other. The state represents whether the corresponding partial process has been completed or not. The execution result represents an execution result of the corresponding partial process obtained from each of the execution node computers 1. Note that the execution result is represented by a hash value, for example, in order to reduce the amount of information. The execution node identifies a node that executed the corresponding partial process. The execution time is a point in time at which the corresponding partial process is executed.

For example, the compression processing included in the video processing application is executed by the execution node computers 1A, 1B, and 1C. Here, the execution results by the execution node computers 1A, 1B, and 1C agree with one another, which means that the number of valid responses is "3". In this case, because the number of valid responses reaches the number of necessary responses, the state of the compression processing is "completed".

The mosaic processing is executed by the execution node computers 1D, 1B, and 1A. The execution results by the execution node computers 1D and 1A agree with each other, but the execution result from the execution node computer 1B is different from the other two execution results. Thus, the number of valid responses is "2". In this case, because the number of valid responses is less than the number of necessary responses, the state of the mosaic processing is "uncompleted".

The consensus unit 12 attempts to form a consensus of the execution results from the execution node computers 1 in cooperation with the consensus units 12 in the other nodes. Note that like the request, unit 32 of the request node computer 3, the consensus unit 12 has an execution node list in FIG. 9.

The selector 13 selects a partial process that has not been completed from among the partial processes included in the application to be executed. In other words, the selector 13 refers to a trail in its own node and selects, from among multiple partial processes, an uncompleted partial process with the number of equivalent execution results being less than the number of necessary responses. For example, in the example in FIG. 10, the compression processing and the sound processing have been completed, but the mosaic processing and the caption processing have not been completed. In such a case, the selector 13 selects the mosaic processing or the caption processing. When the execution order of partial processes is specified in advance, the selector 13 selects a partial process that is the first in the execution order from among the partial processes that have not been completed.

The execution unit 14 executes the partial process selected by the selector 13. Note that the selector 13 and the execution unit 14 may be operated in an integrated manner. In such a case, the selector 13 and the execution unit 14 select and execute a partial process that has not been completed. The communication unit 15 communicates with the request node computer 3 and other execution node computers 1 over a network.

FIG. 11 to FIG. 14 illustrate an example of a sequence when the distributed computing system 100 executes a provided application. This sequence includes a start phase illustrated in FIG. 11, an execution phase illustrated in FIG. 12, a consensus phase illustrated in FIG. 13, and a termination phase illustrated in FIG. 14. Note that an application to he executed is provided from a user to the request node computer 3 before this sequence starts. In such a case, this application is registered in a process list managed by the process manager 31. In the following description, the application provided to the distributed computing system 100 may be referred to as "target application" or "target process".

In FIG. 11 to FIG. 14, "REQ 32", "MAN 31", "VER 33", and "COM 34" represent the request unit 32, the process manager 31, the verification unit 33, and the communication unit 34, respectively. "COM 15", "TR_MAN 11", "SEL 13", "EXE 14", and "CONSUS 12" represent the communication unit 15, the trail manager 11, the selector 13, the execution unit 14, and the consensus unit 12.

Figure 11:
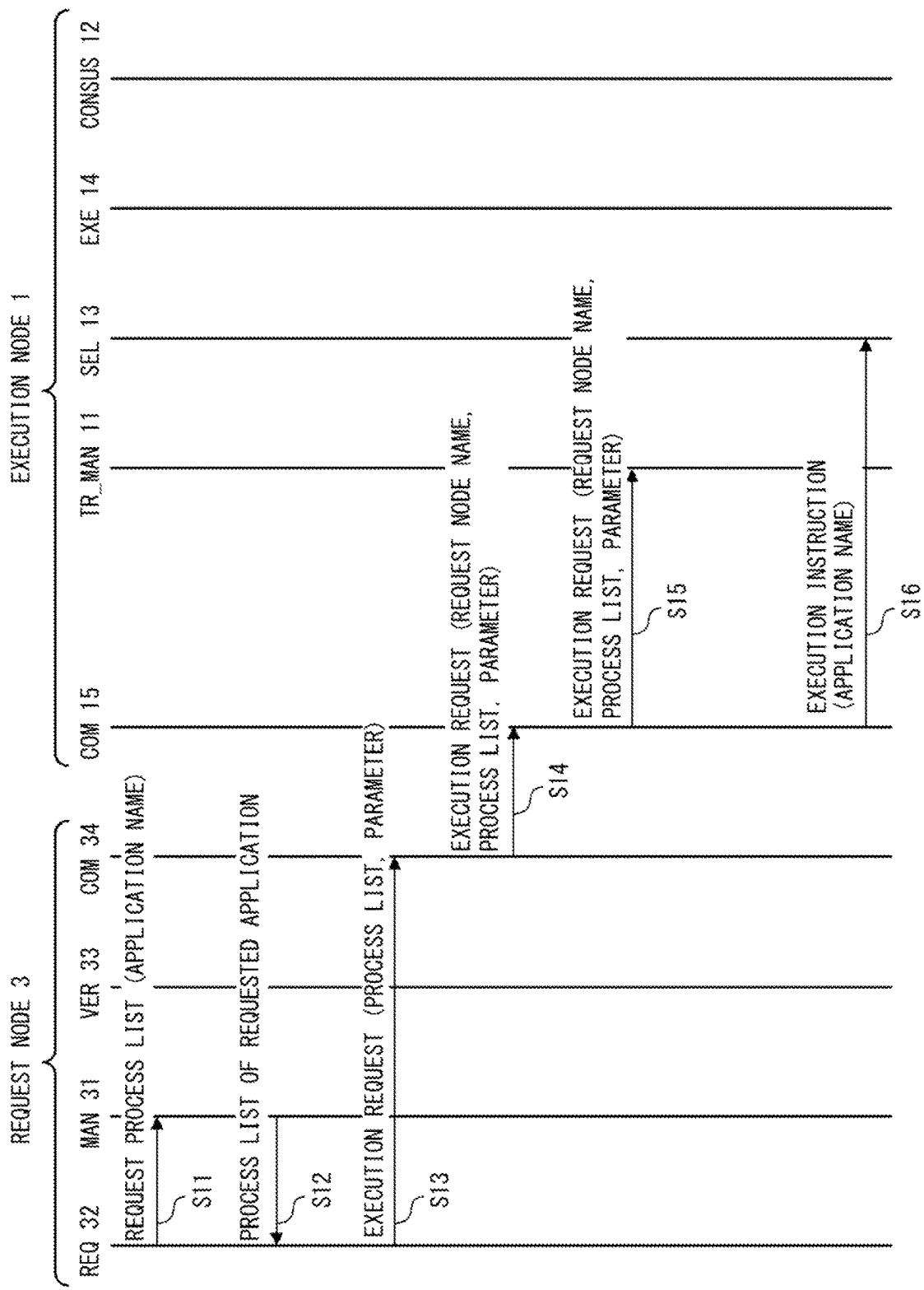
FIG. 11 illustrates an example of a sequence of a start phase.

FIG. 11 illustrates an example of a sequence of the start phase. The start phase is initiated in the request node computer 3 in response to an instruction input from a user, for example.

In S11, the request unit 32 requests the process manager 31 to send a process list related to a target application. This request includes information indicating the target application name (or the target application identification).

In S12, the process manager 31 transmits a process list related to the target application to the request unit 32 in response to the request received from the request unit 32. The process list includes, for example a partial process list as illustrated in FIG. 8. The process list also includes information indicating the number of necessary responses for each partial process.

In S13, the request unit 32 gives the communication unit 34 an execution request for requesting the execution of the target application. The execution request includes the process list related to the target application and parameters.

In S14, the communication unit 34 transmits the execution request received from the request, unit 31 to all the execution node computers 1. Here, the execution request includes information identifying a transmission source of the execution request (here, the request node computer 3) in addition to the process list related to the target application and parameters.

S15 to S16 are executed by the execution node computers 1 that received the execution request from the request node computer 3. More specifically, in S15, the communication unit 15 gives the trail manager 11 the execution request received from the request node computer 3. The trail manager 11 records the data of the received execution request in the trail. In the example in FIG. 10, based on the received execution request, the trail manager 11 records an application name, parameters, request node names, a partial process list, the number of necessary responses and others in the trail.

In S16, the communication unit 15 provides an execution instruction to the selector 13 based on the execution request received from the request node computer 3. The execution phase is thereby initiated.

FIG. 12 illustrates an example of a sequence of the execution phase. The execution phase is initiated in the execution node computer 1 that received the execution request from the request node computer 3. More specifically, when the execution instruction in 516 in FIG. 11 is provided to the selector 13, the execution phase is initiated.

The execution phase is executed to each of the partial processes of the target application. In other words, S21 to S28 are repeatedly executed. When all the partial processes have been completed, the execution phase is terminated.

In S21, the selector 13 makes an inquiry to the trail manager 11 as to whether a partial process that has not been completed is remaining or not. At that time, the selector 13 notifies the trail manager 11 of information indicating the target application name (or the target application identification). Note that in the following description, a partial process that, has not been completed may be referred to as "uncompleted partial process".

In S22, the trail manager 11 refers to the trail and searches for any uncompleted partial process. In the example in FIG. 10, the compression processing and the sound processing have been completed, but the mosaic processing and the caption processing have not been completed. The trail manager 11 notifies the selector 13 of the search result. Here, when an uncompleted partial process is found, the trail manager 11 notifies the selector 13 of all the uncompleted partial processes.

In S23, the selector 13 detects whether any uncompleted partial process is remaining or not based on the search result received from the trail manager 11. When uncompleted partial processes are remaining, in S24, the selector 13 selects a partial process to be executed from among the uncompleted partial processes that were notified. At that time, the selector 13 selects a partial process that is to be executed first from among the uncompleted partial processes that were notified. The selector 13 then provides an execution instruction of the selected partial process to the execution unit 14. This execution instruction includes the target application name and the name of the selected partial process.

In S25, the execution unit 14 executes the partial process selected by the selector 13. In S26, the execution unit 14 requests the consensus unit 12 to form a consensus of the execution result. The consensus request includes the target application name, the name of the executed partial process, and the execution result.

The consensus phase is executed in S27. Note that the consensus phase is explained later with reference to FIG. 13. Here, the following description is under the assumption that a consensus on the execution result in S25 has been formed by multiple execution node computers 1.

In S28, the consensus unit 12 notifies the execution unit 14 of a consensus on the execution result being formed. In S28, the execution unit 14 forwards the notification to the selector 13. At that time, the execution unit 14 gives the selector 13 the execution result obtained in S25.

Afterwards, the sequence of the execution phase returns to S21. More specifically, the execution node computer 1 selects and executes uncompleted partial processes one by one in the execution order. When all the partial processes are completed, in S23, the selector 13 provides a termination notification to the communication unit 15. The selector 13 also provides the execution results of partial processes to the communication unit 15.

Note that in this embodiment, as explained with reference to FIG. 4A, FIG. 4B, FIG. 5A, FIG. 5B, and FIG. 6, the execution node computer 1 executes a selected partial process by using an execution result of a partial process that is one process before the selected partial process. Accordingly, the execution result of the last partial process corresponds to an execution result of all the partial processes (i.e., an execution result of the target application). In other words, when all the partial processes have been completed in S23, an execution result of the target application is provided from the selector 13 to the communication unit 15.

In this manner, in the execution phase, a partial process selected by the selector 13 is executed by the execution unit 14. When all the partial processes have been completed, an execution result is provided from the selector 13 to the communication unit 15.

Figure 13:
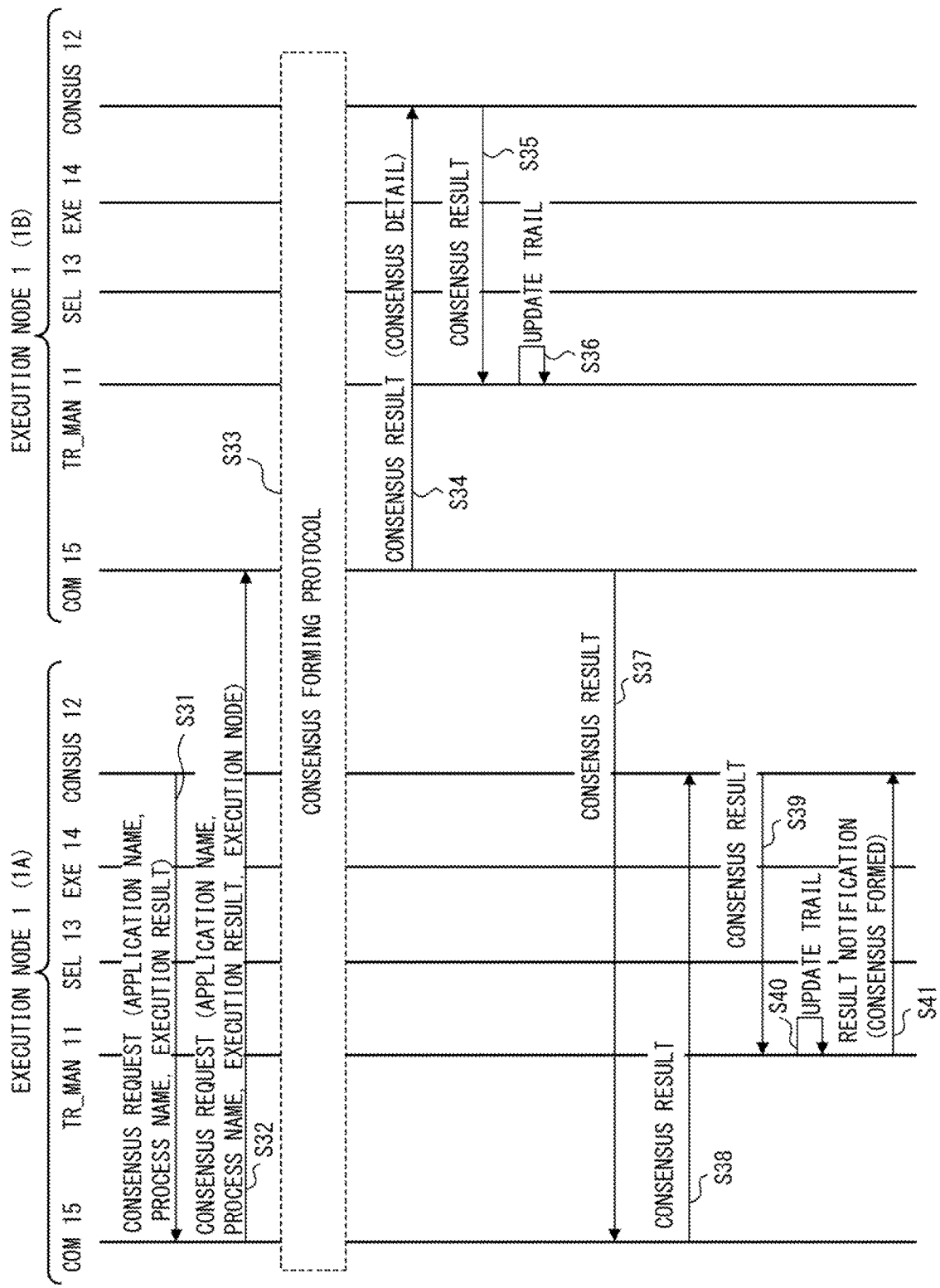
FIG. 13 illustrates an example of a sequence of a consensus phase.

FIG. 13 illustrates an example of a sequence of the consensus phase. The consensus phase corresponds to S27 in the execution phase in FIG. 12. In other words, when the execution result of a selected partial process is provided to the consensus unit 12, the consensus phase is initiated. Note that in the following description, a consensus on the execution result, of the execution node computer 1A is formed by some or all of the execution node computers 1. In FIG. 13, the execution node computer 1B may be any one of the execution node computers 1 other than the execution node computer 1A.

In S31, the consensus unit 12 forwards a consensus request received from the execution unit 14 to the communication unit 15. In S32, the communication unit 15 transmits the consensus request received from the consensus unit 12 to all the execution node computers 1 (in FIG. 13, the execution node computer 1B). At that time, the consensus request includes information identifying a transmission source of the consensus request (i.e., the execution node computer 1A).

In S33, the execution node computers 1A and 1B form a consensus on the execution result of the execution node computer 1A in accordance with a specific consensus forming protocol. For example, PBFT (Practical Byzantine Fault Tolerance), PoW (Proof of Work), or PoS (Proof of Stake) may be used as such a consensus forming protocol. In this embodiment, a consensus on the execution node that executed the selected partial process, the execution result, the execution time and others is formed. The consensus result that indicates details of the consensus in accordance with a consensus forming protocol is transmitted to the execution node computers 1. In other words, the communication unit 15 in each of the execution node computers 1 receives the consensus result from the other execution node computers 1.

S34 to S36 are executed in the execution node computer 1B. More specifically, in S34, the communication unit 15 provides the received consensus result to the consensus unit 12. The consensus unit 12 provides the details of the consensus to the trail manager 11. The trail manager 11 records the details of the consensus formed by the execution node computers 1A and 1B in the trail. Note that a method of updating the trail is explained later with reference to FIG. 15.

In S37, the consensus result is transmitted to the execution node computer 1A, and this causes the execution node computer 1A to execute S38 to S40. Here, S38 to S40 are substantially the same as S34 to S36. In other words, in the execution node computer 1A as well, the trail manager 11 records the details of the consensus formed by the execution node computers 1A and 1B in the trail. As a result, the same information is recorded in the trail of each of the nodes.

In S41, the trail manager 11 provides, to the consensus unit 12, a notification that indicates the update of the trail has been completed. In other words, a notification indicating that a consensus on the execution result in S25 was formed by some or all of the execution node computers 1 is provided from the trail manager 11 to the consensus unit 12. Afterwards, the consensus unit 12 executes S28 in FIG. 12.

In this manner, in the consensus phase, a consensus on an execution result of an execution node computer (in FIG. 12 and FIG. 13, the execution node computer 1A) is formed by some or all of the execution node computers 1. Each execution result on which a consensus is formed is recorded in the trail of each of the execution node computers 1. As a result, all the execution node computers 1 store the same trail.

Figure 14:
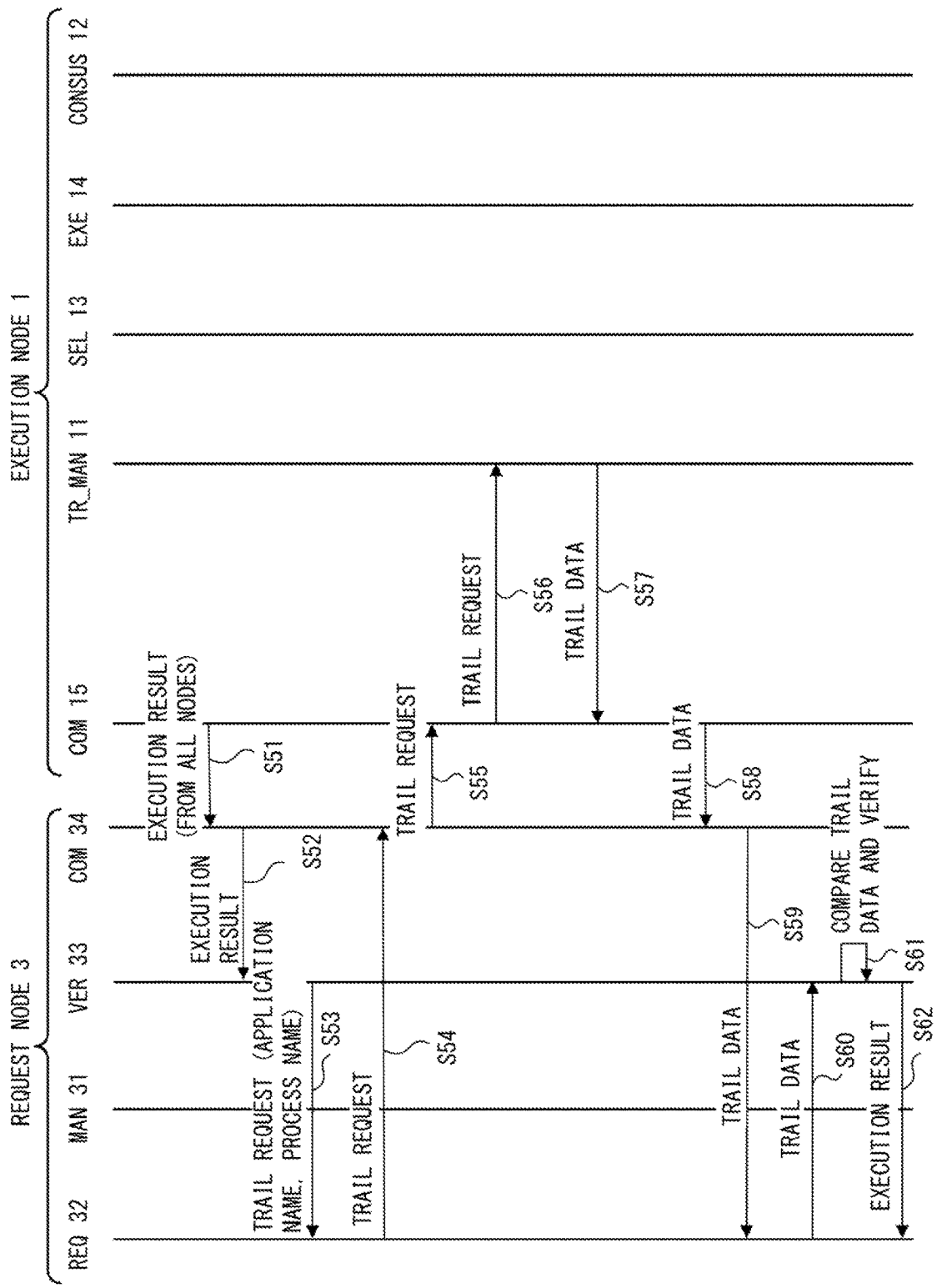
FIG. 14 illustrates an example of a sequence of a termination phase.

FIG. 14 illustrates an example of a sequence of the termination phase. The termination phase is executed when all the partial processes have been completed in S23 in FIG. 12.

In S51, the communication unit 15 in each of the execution node computers 1 transmits the execution result received from the selector 13 in S23 in FIG. 12 to the request, node computer 3. The communication unit 34 in the request node computer 3 receives the execution results from the execution node computers 1.

In S52, the communication unit 34 gives the verification unit 33 the execution results received from the execution node computers 1. In S53, the verification unit 33 collects the trails of the execution node computers 1 to check the validity of the execution results received from the execution node computers 1. In other words, the verification unit 33 generates a trail request that requests transmission of trails and gives the request unit 32 the generated request. This trail request includes a target application name and names of partial processes that form the target application.

In S54 to S56, the trail request is transmitted via the communication unit 34 in the request node computer 3. The communication unit 15 in each of the execution node computers 1 then gives the trail manager 11 the received trail request. Accordingly, the trail manager 11 in each of the execution node computers 1 receives the trail request. In S57, the trail manager 11 obtains trail data related to the target application designated by the trail request. At that time, the trail manager 11 obtains the trail data stored in a specific storage area in its own node. The trail manager 11 transmits the obtained trail data to the request node computer 3.

In S58 to S60, the trail data is provided to the verification unit 33 via the communication unit 34 and the request unit 31. In S61, the verification unit 33 compares the trail data collected from the execution node computers 1 with one another. When ail the trail data agrees with each other, the trail data is determined to be correct. Alternatively, when a certain percentage or more of the collected trail data agrees with each other, the trail data may be determined to be correct. In either case, when correct trail data is obtained, the verification unit 33 gives the request unit 32 the execution result received from the execution node computers 1 in S62. The request unit 32 then outputs the execution result.

Afterwards, the request node computer 3 may reward the execution node computers 1 that provided a valid execution result by referring to the received trail data. In other words, when the number of necessary responses or more of equivalent execution results of any given partial process are provided, the execution node computers 1 that provided the execution results may be rewarded. For example, in the embodiment illustrated in FIG. 4A, FIG. 4B, FIG. 5A, FIG. 5B, and FIG. 6, the execution node computers 1A and 1C that provided valid execution results of the partial process 1 are rewarded, the execution node computers 1A and 1B that provided valid execution results of the partial process 2 are rewarded, and the execution node computers 1A and 1C that provided valid execution results of the partial process 3 are rewarded.

FIG. 15 is a flowchart of an example of a process to update a trail. The process in this flowchart corresponds to S36 or S40 in FIG. 13. In other words, the process in this flowchart is executed by the trail manager 11 in each of the execution node computers 1 when a consensus on an execution result is formed. At that time, the trail manager 11 refers to the trail data stored in its own node.

In S71, the trail manager 11 counts the number of equivalent execution results for each execution result. For example, when hash values of execution results are calculated, the number of execution results having the same hash value is counted.

In S72, the trail manager 11 determines whether there is any execution result with the number of equivalent execution results being equal to or larger than the number of necessary responses or not. Note that the number of necessary responses is designated in advance for each partial process.

When there are multiple execution results with the number of equivalent execution results being equal to or larger than the number of necessary responses, in S73, the trail manager 11 detects an execution result for which the number of necessary responses or more of equivalent execution results were collected first among the execution results. The trail manager 11 records the detected execution result in the trail. In S74, the trail manager 11 records the number of execution results detected in S73 as "the number of valid responses". In S75, the trail manager 11 records "state: completed".

As an example, in the embodiment in FIG. 10, the compression processing is executed by the execution node computers 1. In this case, three execution results with the hash value being "7d97 . . . " are obtained. The number of necessary responses is 3. In such a case, the determination result in S72 is "Yes", and S73 to S75 are to be executed. In other words, the execution result of the compression processing is finalized. In addition, "the number of valid responses: 3" and "state: completed" are recorded.

On the other hand, when there is no execution results with the number of equivalent execution result being the number: of necessary responses or more, in S76, the trail manager 11 records all the execution results in the trail. In S77, the trail manager 11 records the maximum value of the number of equivalent execution results as "the number of valid responses". In S78, the trail manager 11 records "state: uncompleted".

For example, in the embodiment in FIG. 10, the mosaic processing is executed by the execution node computers 1. In this case, two execution results with the hash value being "dead . . . " and one execution result with the hash value being "beaf . . . " are obtained. The number of necessary responses is 3. In such a case, the determination result in S72 is "No", and S76 to S78 are to be executed. In other words, the execution result of the mosaic processing has not yet been finalized. "The number of valid responses: 2" and "state: uncompleted" are recorded.

Figure 16:
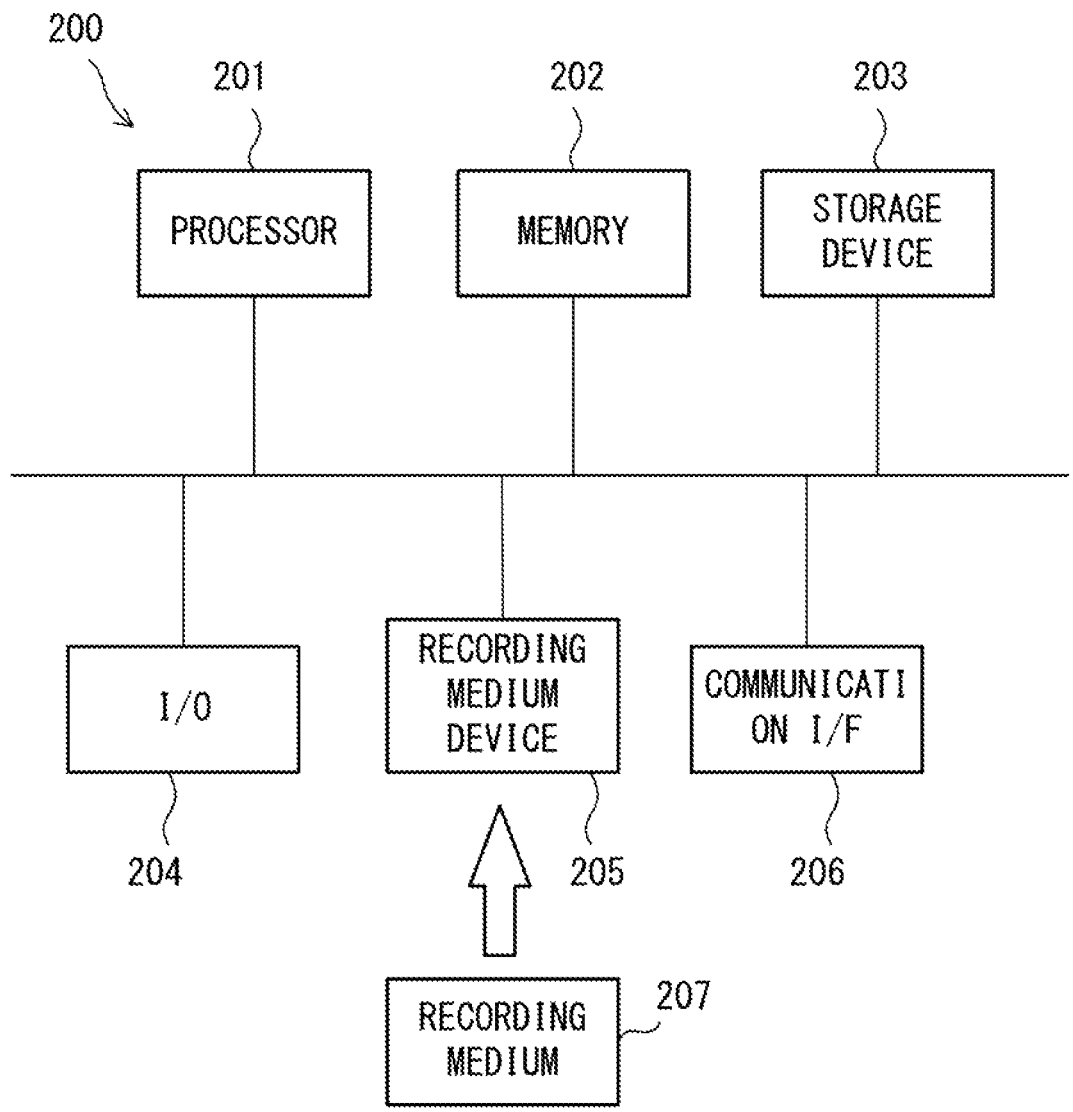
FIG. 16 illustrates an example of a hardware configuration of a computer that operates as a communication device.

FIG. 16 illustrates an example of a hardware configuration of a computer that operates as a communication device implemented in each node. A computer 200 is provided with a processor 201, a memory 202, a storage device 203, an I/O device 204, a recording medium device 205, and a communication interface 206. Note that the computer 200 corresponds to one execution node computer 1.

The processor 201 can provide functions of an execution node computer 1 by executing communication programs stored in the storage device 203. In other words, the processor 201 provide functions of the trail manager 11, the consensus unit 12, the selector 13, the execution unit 14 and the communication unit 15 by executing the communication programs that write the processing in the flowchart of FIG. 3 and FIG. 15 and the processing of the execution node computers 1 in the sequences in FIG. 11 to FIG. 14.

The memory 202 is a semiconductor memory as an example and is used as a work area of the processor 201. The storage device 203 may be implemented in the computer 200 or may be coupled to the computer 200. Note that a trail is stored in the memory 202 or the storage device 203. The I/O device 204 receives instructions from a user or a network administrator. The I/O device 203 outputs processing results of the processor 201. The recording medium device 205 reads signals recorded in a removable recording medium 207. Note that the above-described communication programs may be recorded in the removable recording medium 207. The communication interface 206 includes an interface for data communications and an interface for communicating control information.

Figure 17:
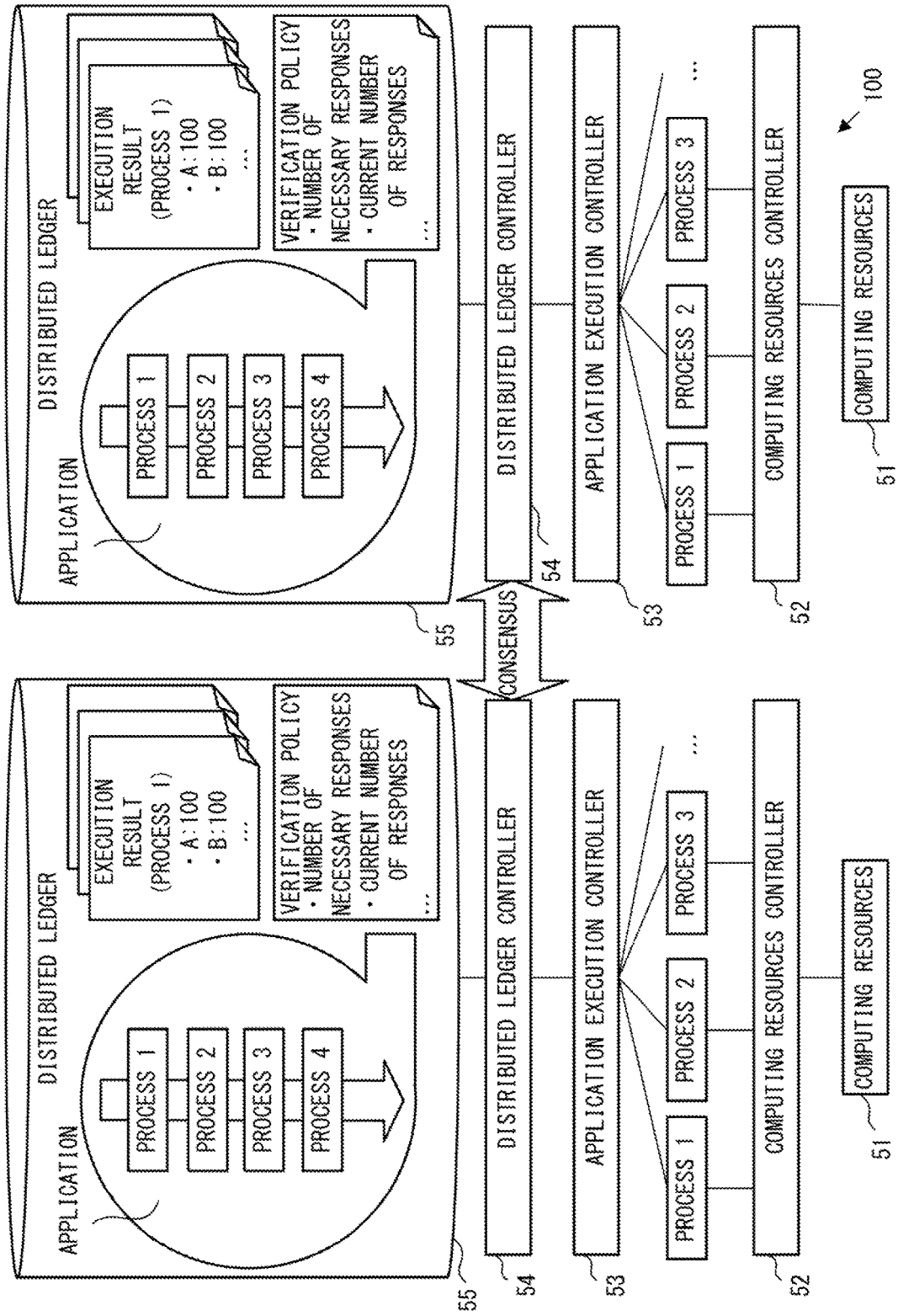
FIG. 17 illustrates an example of a configuration of a distributed computing system.

FIG. 17 illustrates an example of the configuration of the distributed computing system 100. Note that although two execution node computers are illustrated in FIG. 17, the distributed computing system 100 may include more execution node computers.

Each of the execution node computers is provided with computing resources 51, a computing resources controller 52, an application execution controller 53, a distributed ledger controller 54, and a distributed ledger 55. The computing resource 51, the computing resources controller 52, and the application execution controller 53 correspond to the selector 13 and the execution unit 14 in FIG. 7. The distributed ledger controller 54 corresponds to the trail manager 11 and the consensus unit 12. The distributed ledger controller 54 may be realized by HLF (Hyperledger Fabric). The distribute ledger 55 corresponds to a trail managed by the trail manager 11. Note that the contents of the distributed ledger 55 stored in each of nodes agree with one another. The distributed ledger 55 may be realized with the use of the blockchain technology, for example.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a communication program for causing a processor to execute a communication process in a communication device among a plurality of communication devices that execute a target process including a plurality of partial processes, the communication process comprising:
    selecting an uncompleted partial process with a number of equivalent execution results being less than a target number from among the plurality of partial processes according to a trail that represents a state of the plurality of partial processes;
    executing the uncompleted partial process; and
    recording an execution result of the uncompleted partial process in the trail.

2. The non-transitory computer-readable recording medium according to claim 1, wherein
    the execution result of the uncompleted partial process is transmitted to other communication devices, and
    the execution result of the uncompleted partial process is recorded in the trail after a consensus is formed on the execution result of the uncompleted partial process by the plurality of communication devices.

3. The non-transitory computer-readable recording medium according to claim 1, wherein
    the execution result of the uncompleted partial process is recorded in the trail when a number of equivalent execution results of the uncompleted partial process obtained by other communication devices is less than the target number.

4. The non-transitory computer-readable recording medium according to claim 1 wherein the communication process further includes:
  outputting an execution result of the target process when a partial process with the number of equivalent execution results being less than the target number does not exist.

5. A communication device among a plurality of communication devices used in a distributed computing system that executes a target process including a plurality of partial processes by using the plurality of communication devices, the communication device comprising:
  a memory configured to store a trail that represents a state of the plurality of partial processes; and
  a processor configured to
    select, from among the plurality of partial processes, an uncompleted partial process with a number of equivalent execution results being less than a target number according to the trail;
    execute the uncompleted partial process selected by the selector; and
    record an execution result obtained by the execution unit in the trail.

6. A distributed computing method that executes a target process including a plurality of partial processes in a distributed computing system including a plurality of communication devices, wherein
  each of the plurality of communication devices executes a process including:
    selecting an uncompleted partial process with a number of equivalent execution results being less than a target number from among the plurality of partial processes according to a trail that, represents a state of the plurality of partial processes;
    executing the uncompleted partial process; and
    recording an execution result of the uncompleted partial process in the trail.

* * * * *